No. 789,449. PATENTED MAY 9, 1905.
V. POULSEN.
METHOD OF PRODUCING ALTERNATING CURRENTS WITH A HIGH NUMBER OF VIBRATIONS.
APPLICATION FILED JUNE 19, 1903.

3 SHEETS—SHEET 1.

Witnesses:
Frank O. Ober
Waldo M. Chapin

Inventor:
Valdemar Poulsen.
by Wm. A. Rosenbaum
Atty.

No. 789,449. PATENTED MAY 9, 1905.
V. POULSEN.
METHOD OF PRODUCING ALTERNATING CURRENTS WITH A HIGH NUMBER OF VIBRATIONS.
APPLICATION FILED JUNE 19, 1903.

3 SHEETS—SHEET 2.

Witnesses:
Frank D. Ober
Waldo M. Chafin

Inventor,
Valdemar Poulsen
by M. A. Rosenbaum
atty.

Fig. 11.
Fig. 12.
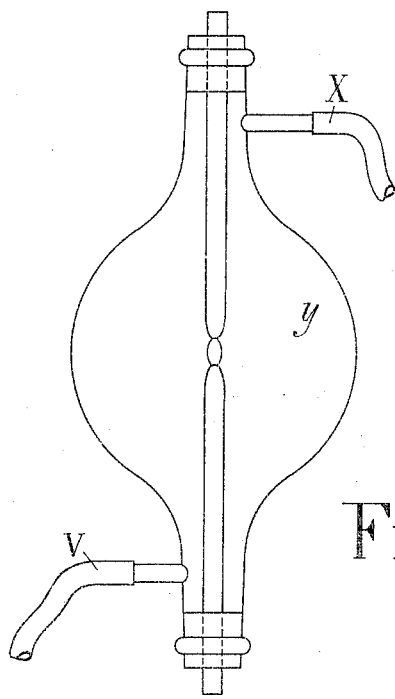
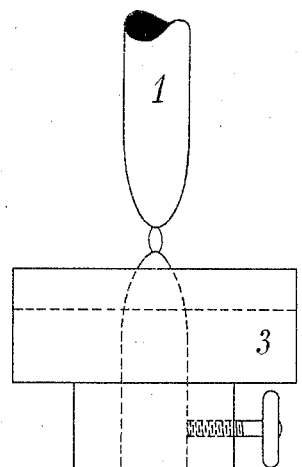
Fig. 13.
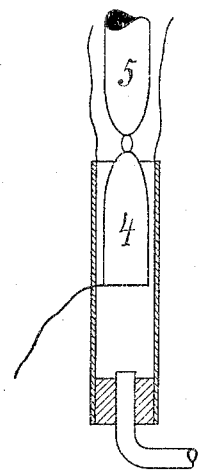
Fig. 14.
Fig. 15.
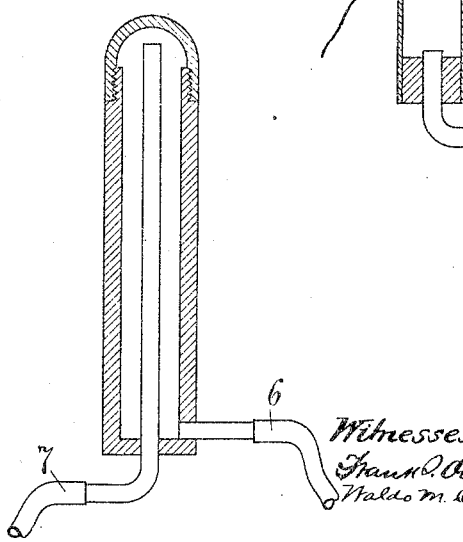
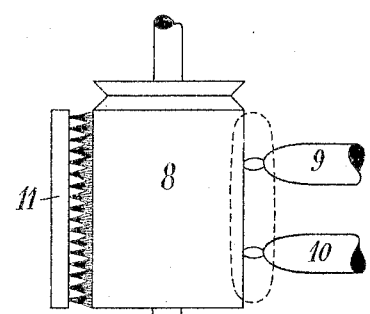

No. 789,449. Patented May 9, 1905.

UNITED STATES PATENT OFFICE.

VALDEMAR POULSEN, OF FREDERIKSBERG, DENMARK.

METHOD OF PRODUCING ALTERNATING CURRENTS WITH A HIGH NUMBER OF VIBRATIONS.

SPECIFICATION forming part of Letters Patent No. 789,449, dated May 9, 1905.

Application filed June 19, 1903. Serial No. 162,183.

*To all whom it may concern:*

Be it known that I, VALDEMAR POULSEN, a citizen of the Kingdom of Denmark, have invented certain new and useful Improvements in Methods of Producing Alternating Currents with a High Number of Vibrations, of which the following is a specification.

As demonstrated by Duddell in his British Patent No. 21,629 of 1900, it is possible by suitable employment of self-induction, capacity, and an electric arc to produce an alternating current from a continuous current. In this way only a proportionately low efficiency has hitherto been reached and no higher number of vibration than at the utmost twenty to thirty thousand vibrations per second.

The present invention aims at producing in a similar way alternating currents of greater useful effect and, if required, of much higher number of vibrations (two hundred thousand to one million or more) by placing the arc and preferably the neighboring parts of the electrodes in an atmosphere containing hydrogen or a compound of hydrogen.

Figure 1:
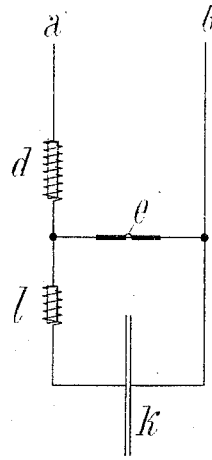
Figure 2:
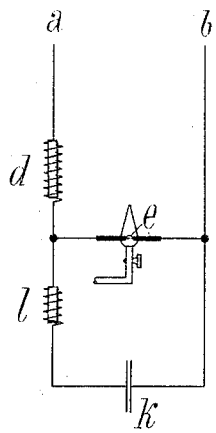
Figure 3:
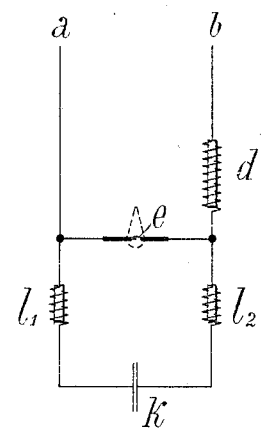
Figure 4:
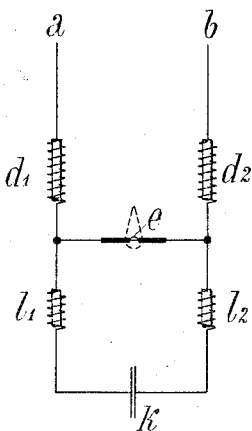
Figure 5:
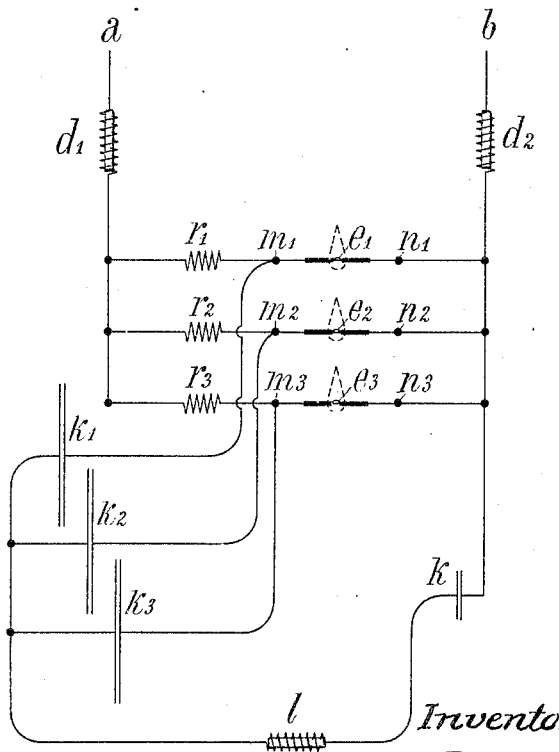
Figure 6:
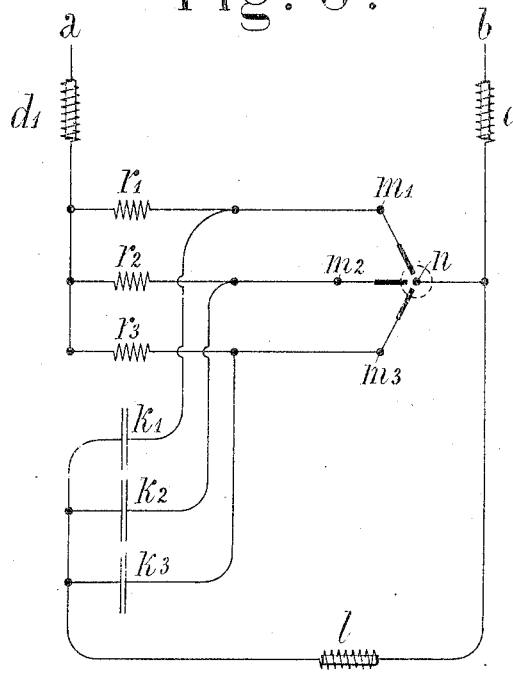
Figure 7:
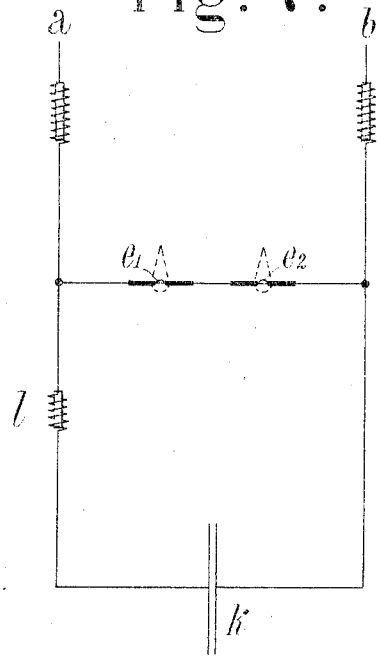
Figure 8:
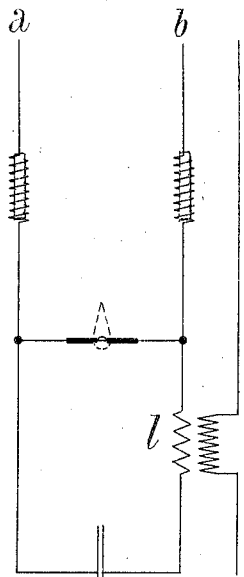
Figure 9:
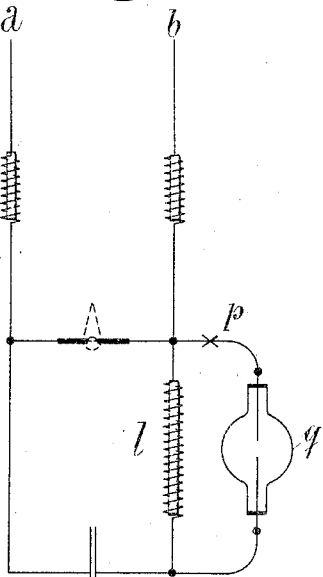
Figure 10:
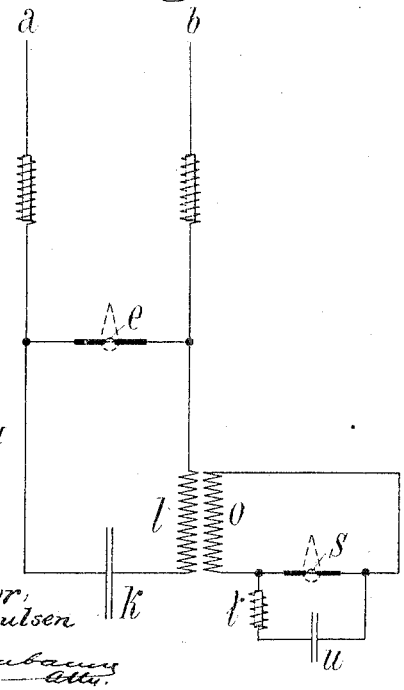

The drawings show, Figure 1, schematically a diagram according to Duddell's system; Figs. 2 to 4, similar devices according to the present invention; Fig. 5, a similar device with more electric arcs arranged in parallel; Fig. 6, a similar device where the different parallelly-placed arcs have a common electrode; Fig. 7, a device with arcs in a series; Fig. 8, one of the previous devices combined with a transformer; Fig. 9, a device combined with a vacuum-tube; Fig. 10, a device for transforming an alternating current produced according to the present invention; Fig. 11, a device by means of which an electric arc can be placed in an atmosphere containing hydrogen; Fig. 12, a device by means of which an electric arc can be surrounded by vapor from a fluid by which at same time an electrode can be cooled; Fig. 13, a device by means of which an electric arc and the electrodes can be surrounded with an ascending current of a gas containing hydrogen; Fig. 14, an electrode which can be cooled by means of a water-current or the like, and Fig. 15 shows a construction involving a rotating electrode.

On Fig. 1, $a$ and $b$ indicate the feed conducting-wire for continuous current; $d$, a self-induction coil; $e$, a voltaic arc formed between two carbons; $l$, the self-induction of the circuit of the alternating current, and $k$ a condenser. The number of vibrations of the circuit of the alternating current is then found to be approximately $$\frac{10^3}{2\pi} \cdot \frac{1}{\sqrt{L K}},$$

where L is henry and K microfarad. On account of the self-induction coil $d$ alternating currents are prevented from flowing out in the feed conducting-wires. As stated, the alternating currents produced in this way are rather limited both as regards intensity and number of vibrations. However, by introducing the electric arc into an atmosphere of hydrogen or some other hydrogen compound the efficiency, intensity, and number of vibrations can be increased considerably. The reason for this advantageous effect can possibly be found in dissociation of the hydrogen in the electric arc. Possibly, also, the great diffusibility of the hydrogen is here a concurrent cause.

A plain form for carrying out the invention is as shown on Fig. 2, wherein the electric arc is located in the inner part of a hydrogen or illuminating gas flame near the emanation-opening. Similar letters in Fig. 2 refer to similar objects in Fig. 1. Fig. 3 shows the same device, but with two self-inductions $l'$ and $l^2$ placed on each side of the electric arc in the circuit of vibrations. On the device shown in Fig. 4 two self-induction coils $d'$ and $d^2$, which prevent the alternating current from flowing out upon the conductors of the continuous current, are inserted, one on each side of the electric arc. Experiments with this apparatus show that as the intensity of the continuous current increases the amplitude of the alternating currents diminishes or collapses and will finally cease; but the reason for the phenomenon is not at present known. Fig. 5 shows a device by which it is possible to transform a considerable quantity of energy with same number of vibrations in the system of alternating currents by means of more electric arcs placed in parallel. The letters $a$, $b$, $d'$, and $d^2$ refer to the same objects as in the previous case. The three electric arcs $e'$, $e^2$, and $e^3$ are here directly connected with one of the feed conducting-wires, while they are connected with the other feed conducting-wire through resistances $r'$, $r^2$, and $r^3$, (preferably also self-inductions,) sufficiently large to enable the electric arcs to be kept burning simultaneously. One pole of each of the electric arcs $e'$, $e^2$, and $e^3$ is connected with one coating of one of the condensers $k'$, $k^2$, and $k^3$, the other coatings of which are mutually connected and connected with one coating of the common condenser $k$. The other coating of this condenser is connected with the other pole of the electric arcs. The self-induction of the vibration system is here represented as $l$ and the resistance in the electric arcs $e'$, $e^2$, and $e^3$. The capacity of each of the condensers $k'$, $k^2$, and $k^3$ is greater than the capacity of the condenser $k$, and the capacities are mutually adjusted in such a manner that the electric arcs $e'$, $e^2$, and $e^3$ are approximately or completely syntonized. As will be seen, the condensers $k'$, $k^2$, and $k^3$ keep the electrodes $m'$, $m^2$, and $m^3$ thus separated from each other, so that continuous current cannot pass from one electrode to the other. As the electrodes $n'$, $n^2$, and $n^3$ have all the same potential, they may be replaced by a single electrode. Fig. 6 shows the diagram thus simplified. The common electrode is marked $n$. The other letters refer to the same objects as in Fig. 5. Furthermore, this diagram differs from the diagram shown in Fig. 5 by the common condenser $k$ being left out. In this and similar ways as many electric arcs as wished may be joined in parallel, and a syntonic addition of the alternating currents produced by the electric arcs can be obtained. Of course the alternating currents produced by the parallelly-placed electric arcs can have different numbers of vibrations and the interference effect resulting therefrom can be employed. When very high numbers of vibrations are wanted and a condenser of low capacity for this reason must be used, more electric arcs can, as shown in Fig. 7, advantageously be placed in a series.

If, as shown in Fig. 8, the self-induction $l$ forms the primary coil of a transformer, preferably oil-insulated, an alternating current of higher or lower potential can be induced in the secondary coil of same. The secondary conductor combined with the devices known in wireless signalizing can be used in wireless telegraphy and telephony, and on account of the continuance of the produced waves of determinate length the system is fit for syntonized telephony and telegraphy. Such a transforming can also be used for producing Roentgen rays, cathode-rays, and light in vacuum-tubes. Wireless signaling and all the other problems named can be carried out even without a real transformer when sufficient difference of potential between the coatings of the condenser $k$ is produced. Fig. 9 shows such a device where the vacuum-tube $q$ is arranged in parallel with the self-induction $l$. If necessary, a resistance or condenser can be inserted some place in the circuit—for instance, at $p$—in series with the vacuum-tube. It is not necessary, though, that the feed-conductors $a$ and $b$ conduct continuous current. An alternating current can also in the named manner be transformed into an alternating current of some other frequency. Fig. 10 shows a diagram at which an alternating current produced in the described manner in the secondary coil $o$ induces another alternating current of same frequency, which alternating current again by means of the electric arc $s$, the condenser $u$, and the self-induction $t$ is transformed into an alternating current of some other frequency. The manner in which the electric arc is placed in a hydrogenic atmosphere can be very different. Besides the gas-flame, (shown in Fig. 2,) alcohol-vapor, ether-vapor, or the like can be used, which vapors probably at the influence of the electric arc will be dissociated into hydrogen and carbon. The electric arc can also be placed in a reservoir containing hydrogen or a gaseous hydrogen compound. Such a device is shown in Fig. 11. The gas in question can, through the tubes $v$ and $x$, be conducted to and from the reservoir $y$, in which the electric arc is placed, and, if necessary, the gas can be replenished by simultaneously conveying and removing the gas without essentially altering the pressure in the reservoir. The pressure can be higher or lower, preferably much higher or much lower, than the pressure of the atmosphere. Fig. 12 shows the electrodes 1 and 2 arranged vertically one above the other, the lowermost electrode being surrounded by a cup 3 with water or some other liquid and volatile hydrogen compound, which by the heat from the electric arc is brought to evaporate and thereafter is dissociated in the arc. The electrodes need not consist of carbon, but can consist of metals—for instance, copper, silver, platina, aluminium, &c. Fig. 13 shows another arrangement in which the gas streams out through a tube which surrounds the electrode 4. The outstreaming gas surrounds the electric arc and the neighboring part of the electrode 5 and is eventually lighted. An artificial augmentation or diminishing of the temperature of the electrodes or one of the electrodes can be of essential importance for a continual maintenance of the electrical vibrations and contribute to keeping the electric arc quiet. If wanted, one electrode can be heated while the other is cooled off. Fig. 14 shows an electrode which can be cooled off by, for instance, leading a jet of water in through the tube 6 and out through the tube 7, or vice versa. The employment of such a cooled-off copper electrode as anode and a carbon rod as cathode is very appropriate. An inconvenient deposit of carbon may take place in the employment of carbureted hydrogen as atmosphere or when carbon is employed as material for the electrodes, or the electrodes may be worn out in an irregular manner. Therefore it may be preferable to devise the electrodes mutually movable, so that the pole area continually is changed. Fig. 15 shows a device in which the cylindrical electrode 8 can rotate while the electrodes 9 and 10 stand still. Preferably a brush 11 can serve for cleaning and polishing the surface of the cylinder 8. The cylinder can easily be arranged for cooling—for instance, by being made hollow and with a hollow shaft through which water can be passed.

The devices and diagrams here described are only examples of constructions and may be varied and mutually combined in various manners without altering the nature of the invention.

Having thus described my invention, I claim as new and desire to secure by Letters Patent—

1. The method of producing alternating currents of high frequencies which consists in subjecting an electric arc to an atmosphere containing hydrogen while the electrodes between which the arc is formed are connected in a circuit containing self-induction and capacity.

2. The method of producing alternating currents of high frequencies, which consists in subjecting an electric arc to an atmosphere containing hydrogen at a pressure different from one atmosphere, while the electrodes between which the arc is formed are connected in a circuit containing self-induction and capacity.

3. The method of producing alternating currents of high frequencies, which consists in subjecting an electric arc to an atmosphere containing hydrogen, while the electrodes between which the arc is formed are connected in a circuit containing self-induction and capacity and simultaneously cooling the electrodes.

4. The method of producing alternating currents of high frequencies, which consists in subjecting a plurality of electric arcs to an atmosphere containing hydrogen while all of said arcs are connected in a circuit containing self-induction and capacity.

In testimony that I claim the foregoing as my invention I have signed my name in presence of two subscribing witnesses.

VALDEMAR POULSEN.

Witnesses:
   C. V. SCHOU,
   FLEMMING ALGRAU USSING.